United States Patent [19]

Matsumoto

[11] Patent Number: 5,164,926
[45] Date of Patent: Nov. 17, 1992

[54] OVER-WRITE CAPABLE MAGNETOOPTICAL RECORDING MEDIUM WITH FOUR MAGNETIC LAYERED STRUCTURE DISPENSING WITH EXTERNAL INITIALIZING FIELD

[75] Inventor: Hiroyuki Matsumoto, Tokyo, Japan
[73] Assignee: Nikon Corporation, Tokyo, Japan
[21] Appl. No.: 756,331
[22] Filed: Sep. 6, 1991

[30] Foreign Application Priority Data

Sep. 27, 1990 [JP] Japan .................. 2-257928

[51] Int. Cl.$^5$ ...................... G11B 13/04; G11B 11/10; G11B 11/12
[52] U.S. Cl. ........................ 369/13; 360/59; 360/114; 369/275.2; 369/288; 369/272; 418/694
[58] Field of Search .................. 369/13, 14, 284, 286, 369/288, 272, 275.2; 360/59, 114; 365/10, 22, 27, 122; 428/694, 900

[56] References Cited

FOREIGN PATENT DOCUMENTS 0258978  3/1988  European Pat. Off. ............. 369/13
3619618A 6/1986  Fed. Rep. of Germany .
63-70944 3/1988  Japan .................. 360/114
1-241051 9/1989  Japan .................. 369/13

WO90/02400 2/1990 PCT Int'l Appl. .

OTHER PUBLICATIONS

"The Bell System Technical Journal", vol. 62, (1983), pp. 1923-1936.

Primary Examiner—Hoa Nguyen
Attorney, Agent, or Firm—Shapiro and Shapiro

[57] ABSTRACT

A medium comprises a memory layer, a writing layer, a switching layer, and an initializing layer, these four layers consisting of perpendicularly magnetizable magnetic films being stacked in order, wherein the memory layer and the writing layer are exchange-coupled, a direction of magnetization of only the writing layer can be aligned in a predetermined direction without changing a direction of magnetization of the memory layer, and the writing layer and the initializing layer are exchange-coupled via the switching layer at a temperature equal to or lower than the Curie temperature of the switching layer. The writing layer is RE-rich at room temperature and has compensation temperature between room temperature and its Curie temperature, and the initializing layer is RE-rich at room temperature and has no compensation temperature between room temperature and its Curie temperature.

2 Claims, 9 Drawing Sheets

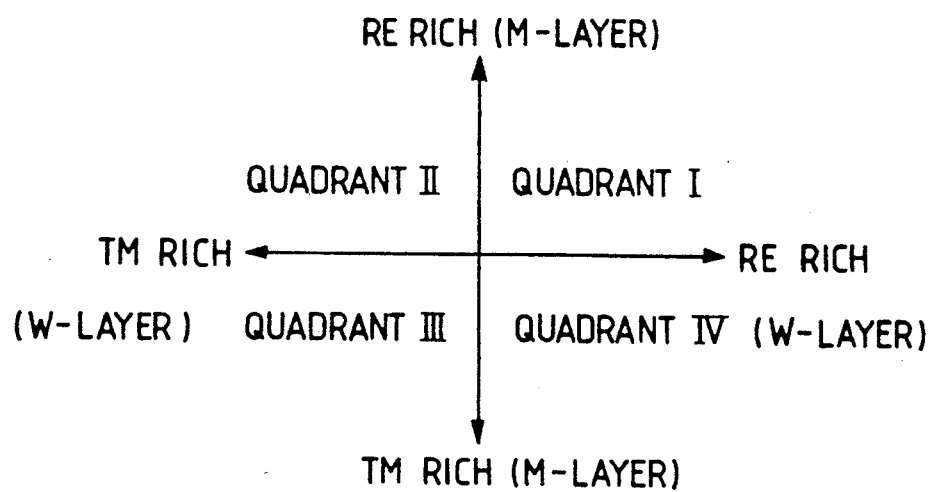
FIG. 5
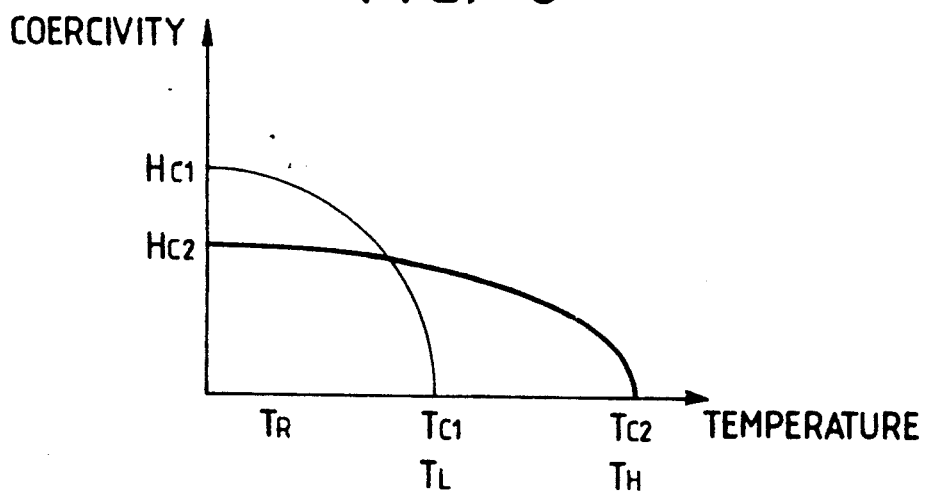
FIG. 6
FIG. 7
| 1st LAYER | ⇧ ⇩ ⇩ ⇧ ⇩ ⇧ ⇩ ⇩ * |
| --- | --- |
| 2nd LAYER | ⇧ ⇧ ⇧ ⇧ ⇧ ⇧ ⇧ ⇧ |

Hini. ↑   CONDITION 1

Hb ↓  CONDITION 2

Hb ↓  CONDITION 3        Hb ↓  CONDITION 4
P TYPE                                        A TYPE

Hb ↓  CONDITION 5

Hb ↓  CONDITION 6        Hb ↓  CONDITION 7
P TYPE                                        A TYPE

CONDITION 1

CONDITION 2

CONDITION 3
P TYPE

CONDITION 4
A TYPE

CONDITION 5
P TYPE

CONDITION 6
P TYPE

CONDITION 7
A TYPE

CONDITION 8
A TYPE

CONDITION 9
P TYPE

CONDITION 10
A TYPE (1A)   (1B)    (2A)   (2B)

(3A)   (3B)    (4A)   (4B)

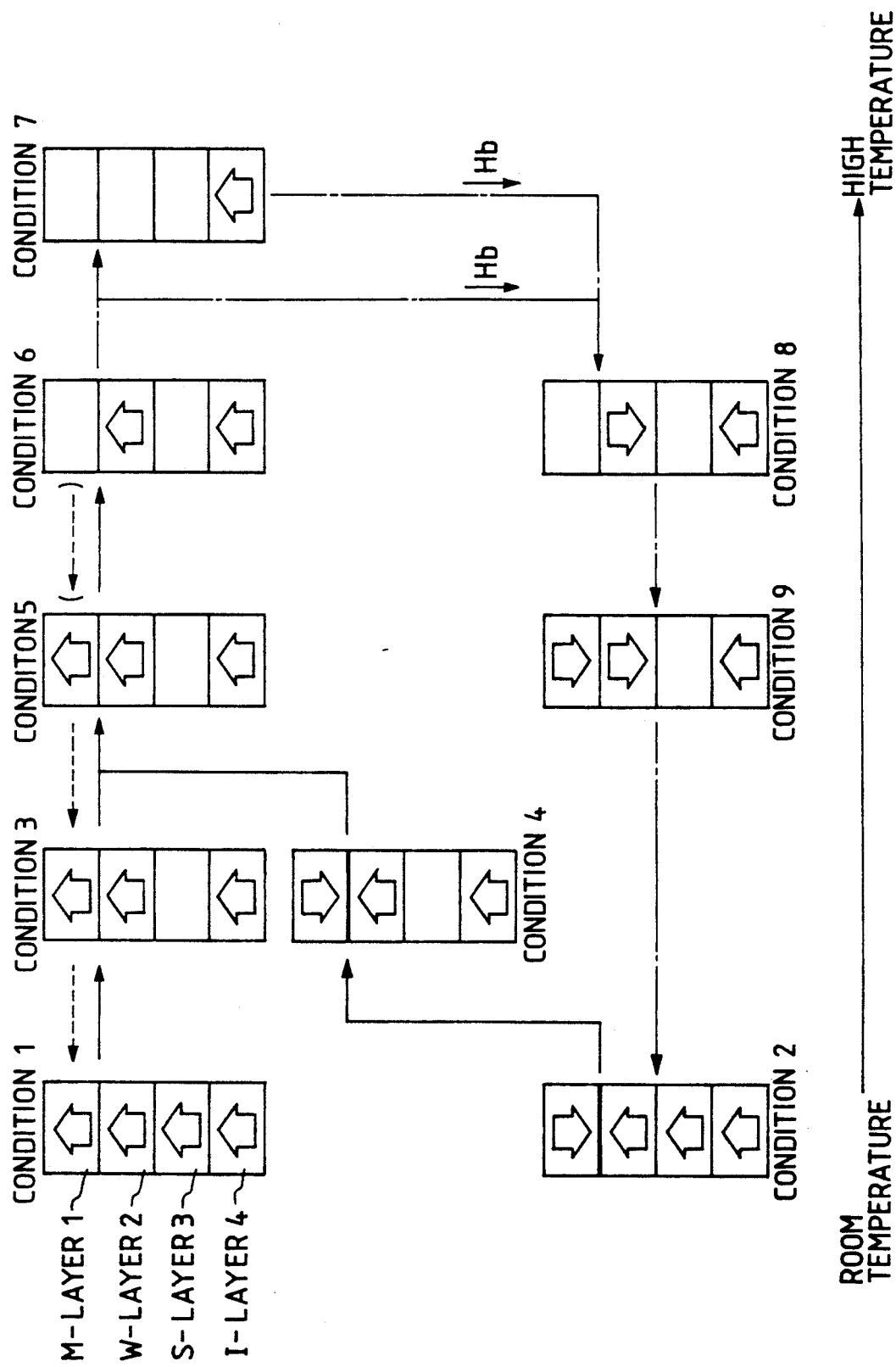

OVER-WRITE CAPABLE MAGNETOOPTICAL RECORDING MEDIUM WITH FOUR MAGNETIC LAYERED STRUCTURE DISPENSING WITH EXTERNAL INITIALIZING FIELD

BACKGROUND OF THE INVENTION

1. Field of the Invention

The present invention relates to a magnetooptical recording medium having a four-layered structure and capable of performing an over-write operation by modulating only an intensity of a light beam in accordance with information to be recorded without modulating a direction and strength of a bias field Hb.

2. Related Background Art

In recent years, many efforts have been made to develop an optical recording/reproduction method which can satisfy various requirements including high density, large capacity, high access speed, and high recording/reproduction speed, and a recording apparatus, a reproduction apparatus, and a recording medium used therefor.

Of various optical recording/reproduction methods, the magnetooptical recording/reproduction method is most attractive due to its unique advantages in that information can be erased after it is recorded, and new information can be repetitively recorded.

A recording medium used in the magnetooptical recording/reproduction method has a perpendicular magnetic layer or layers as a recording layer. The magnetic layer comprises, for example, amorphous GdFe or GdCo, GdFeCo, TbFe, TbCo, TbFeCo, and the like. Concentrical or spiral tracks are normally formed on the recording layer, and information is recorded on the tracks. In this specification, one of "upward" and "downward" directions of magnetization with respect to a film surface is defined as an "A direction", and the other one is defined as a "non-A direction". Information to be recorded is binary-coded in advance, and is recorded by two signals, i.e., a bit ($B_1$) having an "A-directed" magnetization, and a bit ($B_0$) having a "non-A-directed" magnetization These bits $B_1$ and $B_0$ correspond to "1" and "0" levels of a digital signal. However, in general, the direction of magnetization of the recording tracks can be aligned in the "non-A direction" by applying a strong external field before recording. This "aligning process" is called "initialize*" in a conventional sense. Thereafter, a bit ($B_1$) having an "A-directed" magnetization is formed on the tracks. Information is expressed in accordance with the presence/absence and/or a bit length of the bit ($B_1$). Note that a bit is often called a mark recently.

PRINCIPLE OF BIT FORMATION

In the bit formation, a characteristic feature of laser, i.e., excellent coherence in space and time, is effectively used to focus a beam into a spot as small as the diffraction limit determined by the wavelength of the laser light. The focused light is radiated onto the track surface to record information by producing bits less than 1 μm in diameter on the recording layer. In the optical recording, a recording density up to $10^8$ bits/$cm^2$ can be theoretically attained, since a laser beam can be concentrated into a spot with a size as small as its wavelength.

As shown in FIG. 2, in the magnetooptical recording, a laser beam (L) is focused onto a recording layer (1) to heat it, while a bias field (Hb) is externally applied to the heated portion in the direction opposite to the initialized* direction. A coercivity $H_C$ of the locally heated portion is decreased below the bias field (Hb). As a result, the direction of magnetization of that portion is aligned in the direction of the bias field (Hb). In this way, reversely magnetized bits are formed.

Ferromagnetic and ferrimagnetic materials differ in the temperature dependencies of the magnetization and $H_C$. Ferromagnetic materials have $H_C$ which decreases around the Curie temperature and allow information recording based on this phenomenon. Thus, information recording in ferromagnetic materials is referred to as $T_C$ recording (Curie temperature recording).

On the other hand, ferrimagnetic materials have a compensation temperature $T_{comp.}$, below the Curie temperature, at which magnetization (M) becomes zero. The $H_C$ abruptly increases around this temperature and hence abruptly decreases outside this temperature. The decreased $H_C$ is canceled by a relatively weak bias field (Hb). Namely, recording is enabled. This process is called $T_{comp.}$ recording (compensation point recording).

In this case, however, there is no need to adhere to the Curie point or temperatures therearound, and the compensation temperature. In other words, if a bias field (Hb) capable of canceling a decreased $H_C$ is applied to a magnetic material having the decreased $H_C$ at a predetermined temperature higher than a room temperature, recording is enabled.

PRINCIPLE OF REPRODUCTION

FIG. 3 shows the principle of information reproduction based on the magnetooptical effect. Light is an electromagnetic wave with an electromagnetic-field vector normally emanating in all directions in a plane perpendicular to the light path. When light is converted to linearly polarized beams ($L_P$) and irradiated onto a recording layer (1), it is reflected by its surface or passes through the recording layer (1). At this time, the plane of polarization rotates according to the direction of magnetization (M). This phenomenon is called the magnetic Kerr effect or magnetic Faraday effect.

For example, if the plane of polarization of the reflected light rotates thro $\theta_k$ degrees for the "A-directed" magnetization, it rotates through $-\theta_k$ degrees for the "non-A-directed" magnetization. Therefore, when the axis of an optical analyzer (polarizer) is set perpendicular to the plane inclined at $-\theta_k$, the light reflected by a "non-A-direction" magnetized bit ($B_0$) cannot pass through the analyzer. On the contrary, a component corresponding to a product of $(\sin 2\theta_k)^2$ and the light reflected by a bit ($B_1$) magnetized along the "A direction" passes through the analyzer and becomes incident on a detector (photoelectric conversion means). As a result, the bit ($B_1$) magnetized along the "A direction" looks brighter than the bit ($B_0$) magnetized along the "non-A direction", and causes the detector to produce a stronger electrical signal The electrical signal from the detector is modulated in accordance with the recorded information, thus reproducing the information.

In order to re-use a recorded medium, (i) the medium must be re-initialized* by an initialize* device, or (ii) an erase head having the same arrangement as a recording head must be added to a recording apparatus, or (iii) as preliminary processing, recorded information must be erased using a recording apparatus or an erasing apparatus.

Therefore, in the conventional magnetooptical recording method, it is impractical to perform an over-write operation, which can properly record new information regardless of the presence/absence of recorded information.

If the direction of a bias field Hb can be desirably modulated between the "A-direction" and "non-A direction", an over-write operation is possible. However, it is impossible to modulate the direction of the bias field Hb at high speed. For example, if the bias field Hb comprises a permanent magnet, the direction of the magnet must be mechanically reversed. However, it is impossible to reverse the direction of the magnet at high speed. Even when the bias field Hb comprises an electromagnet, it is also impossible to modulate the direction of a large-capacity current at high speed.

However, according to remarkable technical developments, a magnetooptical recording method capable of performing an over-write operation by modulating only an intensity of a light beam to be irradiated in accordance with binary coded information to be recorded without modulating a strength (including an ON/OFF state) or the direction of the bias field Hb, an over-write capable magnetooptical recording medium used in this method, and an over-write capable recording apparatus used in this method were invented, as disclosed in a patent application (Japanese Patent Laid-Open Application No. 62-175948 corresponding to DE 3,619,618 and to U.S. application Ser. No. 453,255). This invention will be referred to as the basic invention hereinafter.

DESCRIPTION OF THE BASIC INVENTION

The basic invention uses an "over-write capable multilayered magnetooptical recording medium which includes a recording layer (to be referred to as a memory layer or M layer hereinafter in this specification) which comprises a perpendicularly magnetizable magnetic thin film, and a reference layer (to be referred to as a "writing layer" or W layer hereinafter in this specification) which comprises a perpendicularly magnetizable magnetic thin film, and in which the two layers are exchange-coupled, and the direction of magnetization of only the W layer can be aligned in a predetermined direction without changing the direction of magnetization of the M layer at a room temperature.

Information is expressed by a bit having an "A-directed" magnetization, and a bit having a "non-A-directed" magnetization in the M layer (in some cases, also in the W layer).

In this medium, the direction of magnetization of the W layer can be aligned in an "A direction" by an external means (e.g., an initial field Hini.). At this time, the direction of magnetization of the M layer is not reversed. Furthermore, the direction of magnetization of the W layer which has been aligned in the "A direction" is not reversed upon application of an exchange coupling force from the M layer. In contrast to this, the direction of magnetization of the M layer is not reversed upon application of an exchange coupling force from the W layer aligned in the "A direction".

The W layer has a lower coercivity $H_C$ and a higher Curie temperature $T_C$ than those of the M layer.

According to a recording method of the basic invention, only the direction of magnetization of the W layer of the recording medium is aligned in the "A direction" by an external means until a time immediately before recording. This process will be specially referred to as "initialize" in this specification. The "initialize" process is unique to an over-write capable medium.

Thereafter, a laser beam which is pulse-modulated in accordance with binary coded information is irradiated on the medium. The laser beam intensity has high level $P_H$ and low level $P_L$. These high and low levels correspond to high and low levels of a pulse. Note that low level is higher than very low level* $P_R$ to be irradiated on the medium in a reproduction mode. Therefore, for example, an output waveform of a laser beam in the basic invention is as shown in FIG. 4A.

Although not described in the specification of the basic invention, a recording beam need not always be a single beam but may be two proximity beams in the basic invention. More specifically, a leading beam may be used as a low-level laser beam (erasing beam) which is not modulated in principle, and a trailing beam may be used as a high-level laser beam (writing beam) which is modulated in accordance with information. In this case, the trailing beam is pulse-modulated between high level and base level (equal to or lower than low level, and its output may be zero). In this case, an output waveform is as shown in FIG. 4B.

A bias field Hb whose direction and strength are not modulated is applied to a medium portion irradiated with the beam. The bias field Hb cannot be focused to a size as small as the portion irradiated with the beam (spot region), and a region where the bias field Hb is applied is considerably larger than the spot region.

When a low-level beam is radiated, a bit in one of the "A direction" and the "non-A direction" is formed in the M layer regardless of the direction of magnetization of a previous bit.

When a high-level beam is irradiated, a bit in the other direction is formed in the M layer regardless of the direction of magnetization of the previous bit.

Thus, the over-write operation is completed.

In the basic invention, a laser beam is pulse-modulated according to information to be recorded. However, this procedure itself has been performed in the conventional magnetooptical recording method, and a means for pulse-modulating the beam intensity on the basis of binary coded information to be recorded is a known means. For example, see "THE BELL SYSTEM TECHNICAL JOURNAL, Vol. 62 (1983), pp. 1923-1936 for further details. Therefore, the modulating means is available by partially modifying the conventional beam modulating means if required high and low levels of the beam intensity are given. Such a modification would be easy for those who are skilled in the art if high and low levels of the beam intensity are given.

One characteristic feature of the basic invention lies in high and low levels of the beam intensity. More specifically, when the beam intensity is at high level, "A-directed" magnetization of the W layer is reversed to the "non-A direction" by an external means such as a bias field (Hb) and the like, and a bit having the "non-A-directed" [or "A-directed"] magnetization is thus formed in the M layer by means of the "non-A-directed" magnetization of the W layer. When the beam intensity is at low level, the direction of magnetization of the W layer is left unchanged from the initialized state, and a bit having the "A-directed" [or "non-A-directed"] magnetization is formed in the M layer under the influence of the W layer (this influence is exerted on the M layer through the exchange coupling force).

In this specification, if expressions ooo [or ΔΔΔ] appear, ooo outside the parentheses in the first expression corresponds to ooo in the subsequent expressions ooo [or ΔΔΔ], and vice versa.

A medium used in the basic invention is roughly classified into first and second categories. In either category, a recording medium has a multilayered structure including the M and W layers.

The M layer is a magnetic layer, which exhibits a high coercivity at a room temperature, and has a low magnetization reversing temperature The W layer is a magnetic layer, which exhibits a relatively lower coercivity at a room temperature and has a higher magnetization reversing temperature than those of the M layer. Note that each of the M and W layers may comprise a multilayered structure. If necessary, a third layer (e.g., an adjusting layer for an exchange coupling force $\sigma_w$) may be interposed between the M and W layers. In addition, a clear boundary between the M and W layers need not be formed, and one layer can be gradually converted into the other layer.

In the first category, when the coercivity of the M layer is represented by $H_{C1}$; that of the W layer, $H_{C2}$; a Curie temperature of the M layer, $T_{C1}$; that of the W layer, $T_{C2}$; a room temperature, $T_R$; a temperature of the recording medium obtained when a laser beam at low level $P_L$ is irradiated, $T_L$; that obtained when a laser beam at high level $P_H$ is irradiated, $T_H$; a coupling field applied to the M layer $H_{D1}$; and a coupling field applied to the W layer $H_{D2}$, the recording medium satisfies Formula 1 below, and satisfies Formulas 2 to 5 at the room temperature:

$$T_R < T_{C1} \approx T_L < T_{C2} \approx T_H \qquad \text{Formula 1}$$

$$H_{C1} > H_{C2} + |H_{D1} \mp H_{D2}| \qquad \text{Formula 2}$$

$$H_{C1} > H_{D1} \qquad \text{Formula 3}$$

$$H_{C2} > H_{D2} \qquad \text{Formula 4}$$

$$H_{C2} + H_{D2} < |H_{ini.}| < H_{C1} \pm H_{D1} \qquad \text{Formula 5}$$

In the above formulas, symbol "$\approx$" means "equal to" or "substantially equal to ($\pm 20°$ C.)". In addition, of double signs $\pm$ and $\mp$, the upper sign corresponds to an A (antiparallel) type medium, and the lower sign corresponds to a P (parallel) type medium (these media will be described later). Note that a ferromagnetic medium belongs to a P type.

The relationship between a coercivity and a temperature is as shown in the graph of FIG. 6. In FIG. 6, a thin curve represents the characteristics of the M layer, and a bold curve represents those of the W layer.

Therefore, when an external means, e.g., an initial field (Hini.) is applied to this recording medium at the room temperature, the direction of magnetization of only the W layer is reversed without reversing that of the M layer according to Formula 5. When the external means exerts an influence (e.g., the initial field (Hini.)) on the medium before recording, only the direction of magnetization of the W layer can be aligned in the "A direction". That is, the "initialize" process is performed In the following description, the "A direction" is indicated by an upward arrow in this specification, and the "non-A direction" is indicated by a downward arrow for the sake of simplicity. If the initial field Hini. becomes zero, the direction of magnetization of the W layer can be left unchanged without being re-reversed according to Formula 4.

FIG. 7 schematically shows a state wherein only the W layer is magnetized by the external means in the "A direction" until a time immediately before recording.

In FIG. 7, the direction of magnetization* in the M layer represents previously recorded information. In the following description, since the direction of magnetization of the M layer can be disregarded, it is simply indicated by X, as shown in CONDITION 1 in FIG. 7 or 8.

In CONDITION 1, a high-level laser beam is radiated on the medium to increase a medium temperature to $T_H$. Since $T_H$ is higher than the Curie temperature $T_{C1}$, the magnetization of the M layer disappears. In addition, since $T_H$ is near the Curie temperature $T_{C2}$, the magnetization of the W layer also disappears completely or almost completely. The bias field Hb in the "A direction" or "non-A direction" is applied to the medium in accordance with a type of medium. The bias field Hb may be a stray field from the medium itself. For the sake of simplicity, assume that the bias field Hb in the "non-A direction" is applied to the medium. Since the medium is moving, a given irradiated portion is immediately separated apart from the laser beam, and is cooled. When the medium temperature is decreased under the presence of Hb, the direction of magnetization of the W layer is reversed to the "non-A direction" to follow Hb (CONDITION 2 in FIG. 8).

When the medium is further cooled and the medium temperature is decreased slightly below $T_{C1}$, magnetization of the M layer appears again. In this case, the direction of magnetization of the M layer is influenced by that of the W layer through a magnetic coupling (exchange coupling) force, and is aligned in a predetermined direction. As a result, a "non-A-directed" bit (the P type medium) or an "A-directed" bit (the A type medium) is formed according to the type of medium. This state corresponds to CONDITION 3 (P type) or 4 (A type) in FIG. 8.

A change in condition caused by the high-level laser beam will be called a high-temperature cycle herein.

A laser beam at low level $P_L$ is irradiated on the medium to increase the medium temperature to $T_L$. Since $T_L$ is near the Curie temperature $T_{C1}$, the magnetization of the M layer disappears completely or almost completely. However, since $T_L$ is lower than the Curie temperature $T_{C2}$, the magnetization of the W layer does not disappear. This state is represented by CONDITION 5 in FIG. 8. In this state, although the bias field Hb is unnecessary, it cannot be turned on or off at high speed (within a short period of time). Therefore, the bias field Hb in the high-temperature cycle is left applied inevitably.

However, since the $H_{C2}$ is kept high, the magnetization of the W layer will not be reversed by Hb. Since the medium is moving, a given irradiated portion is immediately separated apart from the laser beam, and is cooled. As cooling progresses, the magnetization of the M layer appears again. The direction of magnetization appearing in this case is influenced by the W layer through the magnetic coupling force, and is aligned in a predetermined direction. As a result, an "A-directed" bit (P type) or a "non-A-directed" bit (A type) is formed in the M layer according to the type of medium. This magnetization is left unchanged at the room temperature. This state corresponds to CONDITION 6 (P type) or 7 (A type) in FIG. 8.

A change in condition caused by the low-level laser beam will be called a low-temperature cycle herein.

As described above, "non-A-directed" and "A-directed" bits can be desirably formed by selecting the high- and low-temperature cycles independently of the direction of magnetization of the M layer before recording. More specifically, an over-write operation is enabled by pulse-modulating the laser beam between high level (high-temperature cycle) and low level (low-temperature cycle) in accordance with information. Refer to FIGS. 9A and 9B. FIGS. 9A and 9B illustrate directions of magnetization of P and A type media at the room temperature or formed when the medium temperature is returned to the room temperature.

In the above description, both the first and W layers have no compensation temperature $T_{comp.}$ between the room temperature and the Curie temperature. However, when the compensation temperature $T_{comp.}$ is present, if the medium temperature exceeds it, ① the direction of magnetization is reversed (in practice, although the directions of sublattice magnetization of RE and TM atoms are not changed, since the relationship between their strengths is reversed, the direction of magnetization of the alloy is reversed), and ② A and P types are reversed. For these reasons, a description must be complicated accordingly. In this case, the direction of the bias field Hb is opposite to the direction ↓ in the above description at the room temperature. That is, Hb in the same direction as the "initialized" direction ↑ of magnetization of the W layer is applied.

A recording medium normally has a disk shape, and is rotated during recording. For this reason, a recorded portion (bit) is influenced again by an external means, e.g., Hini. after recording. As a result, the direction of magnetization of the W layer is aligned in the original "A direction". In other words, the W layer is "initialized". However, at the room temperature, the magnetization of the W layer can no longer influence that of the M layer, and the recorded information can be held.

If linearly polarized light is irradiated on the M layer, since light reflected thereby includes information, the information can be reproduced as in the conventional magnetooptical recording medium.

A perpendicular magnetic film constituting each of the M and W layers is selected from the group consisting of ① amorphous or crystalline ferromagnetic and ferrimagnetic materials having no compensation temperature and having a Curie temperature, and ② an amorphous or crystalline ferrimagnetic material having both the compensation temperature and the Curie temperature.

The first category which utilizes the Curie temperature as the magnetization reversing temperature has been described. In contrast to this, the second category utilizes $H_C$ decreased at a temperature lower than the Curie temperature. In the second category, substantially the same description as the first category can be applied except that a temperature $T_{S1}$ at which the M layer is magnetically coupled to the W layer is used in place of $T_{C1}$ in the first category, and a temperature $T_{S2}$ at which the direction of magnetization of the W layer is reversed by Hb is used in place of $T_{C2}$.

In the second category, when the coercivity of the M layer is represented by $H_{C1}$; that of the W layer, $H_{C2}$; a temperature at which the M layer is magnetically coupled to the W layer, $T_{S1}$; a temperature at which the magnetization of the W layer is reversed by Hb, $T_{S2}$; a room temperature, $T_R$; a medium temperature obtained when a laser beam at low level $P_L$ is irradiated, $T_L$; that obtained when a laser beam at high level $P_H$ is irradiated, $T_H$; a coupling field applied to the M layer, $H_{D1}$; and a coupling field applied to the W layer $H_{D2}$, the recording medium satisfies Formula 6 below, and satisfies Formulas 7 to 10 at the room temperature:

$$T_R < T_{S1} \approx T_L < T_{S2} \approx T_H \qquad \text{Formula 6}$$

$$H_{C1} > H_{C2} + |H_{D1} \mp H_{D2}| \qquad \text{Formula 7}$$

$$H_{C1} > H_{D1} \qquad \text{Formula 8}$$

$$H_{C2} > H_{D2} \qquad \text{Formula 9}$$

$$H_{C2} + H_{D2} < |H_{ini.}| < H_{C1} \pm H_{D1} \qquad \text{Formula 10}$$

In the above formulas, of double signs ± and ∓, the upper sign corresponds to an A (antiparallel) type medium, and the lower sign corresponds to a P (parallel) type medium (these media will be described later).

In the second category, when the medium is at the high temperature $T_H$, the magnetization of the W layer does not disappear, but is sufficiently weak. The magnetization of the M layer disappears, or is sufficiently weak. Even if sufficiently weak magnetization is left in both the M and W layers, the bias field Hb ↑ is sufficiently large, and the Hb ↓ forces the direction of magnetization of the W layer and that of the M layer in some cases to follow that of the Hb ↓. This state corresponds to CONDITION 2 in FIG. 10.

Thereafter, the W layer influences the M layer via $\sigma_w$ ① immediately, or ② when cooling progresses after irradiation of the laser beam is stopped and the medium temperature is decreased below $T_H$, or ③ when the irradiated portion is away from Hb, thereby aligning the direction of magnetization of the M layer in a stable direction. As a result, CONDITION 3 (P type) or 4 (A type) in FIG. 10 is established.

On the other hand, when the medium is at the low temperature $T_L$, both the W and M layers do not lose their magnetization. However, the magnetization of the M layer is relatively weak. In this case, there are two bit states, i.e., CONDITIONs 5 and 6 in FIG. 10 for P type, and there are also two bit states, i.e., CONDITIONs 7 and 8 in FIG. 10 for A type. In CONDITIONs 6 and 8, a magnetic wall (indicated by a bold line) is generated between the M and W layers, and the medium is in a relatively unstable (metastable) condition. The medium portion in this condition is applied with Hb ↓ immediately before it reaches the irradiation position of the laser beam. Nevertheless, CONDITION 6 or 8 can be maintained. Because, since the W layer has sufficient magnetization at the room temperature, the direction of magnetization of the W layer will not be reversed by Hb ↓. The M layer in CONDITION 8, whose direction of magnetization is opposite to Hb ↓, receives the influence of the exchange coupling force $\sigma_w$ larger than the influence of Hb ↓, and the direction of magnetization of the M layer is held in the same direction as that of the W layer since the medium is of P type.

Thereafter, the portion in CONDITION 6 or 8 is irradiated with a low-level laser beam. For this reason, the medium temperature is increased. Upon an increase in medium temperature, the coercivities of the two layers are decreased. However, since the W layer has a high Curie temperature, a decrease in coercivity $H_{C2}$ is small, and the "A direction" corresponding to the "initialized" direction of magnetization is maintained without being overcome with Hb ↓. On the other hand, since the medium temperature is lower than the Curie temperature $T_{C1}$ of the M layer although the M layer has the low Curie temperature, the coercivity $H_{C1}$ remains. However, since the coercivity $H_{C1}$ is small, the M layer receives ① the influence of Hb ↓ and ② the influence via the exchange coupling force $\sigma_w$ from the W layer (force for aligning the direction of magnetization of the M layer in the same direction as that of the W layer in P type). In this case, the latter influence is stronger than the former influence, and the following formulas are simultaneously satisfied:

$$H_{c1} + Hb < \frac{\sigma_w}{2M_{s1}t_1}$$

and $$H_{c2} + Hb > \frac{\sigma_w}{2M_{s2}t_2}$$

The lowest temperature at which these formulas are simultaneously satisfied will be called $T_{LS}$. In other words, the lowest temperature at which the magnetic wall in CONDITION 6 or 8 disappears is $T_{LS}$.

As a result, CONDITION 6 transits to CONDITION 9, and CONDITION 8 transits to CONDITION 10. On the other hand, CONDITION 5 originally having no magnetic wall is the same as CONDITION 9, and CONDITION 7 is the same as CONDITION 10. Consequently, a bit in CONDITION 9 (P type) or 10 (A type) is formed upon irradiation of the low-level beam regardless of the previous state (CONDITION 5 or 6 for P type, or CONDITION 7 or 8 for A type).

This state is maintained when the medium temperature is decreased to the room temperature after the laser beam irradiation is stopped or the bit falls outside the irradiation position. CONDITION 9 (P type) or 10 (A type) in FIG. 10 is the same as CONDITION 6 (P type) or 7 (A type) in FIG. 8.

As can be understood from the above description, the low-temperature cycle is executed without increasing the medium temperature up to the Curie temperature $T_{C1}$ of the M layer.

Even when the low-temperature cycle is executed at a temperature equal to or higher than $T_{C1}$, since the medium temperature is increased from the room temperature to $T_{C1}$ via $T_{LS}$, CONDITION 6 transits to CONDITION 9 for P type, and CONDITION 8 transits to CONDITION 10 for A type at that time. Thereafter, the medium temperature reaches $T_{C1}$, and CONDITION 5 shown in FIG. 8 is established.

In the above description, both the M and W layers have no compensation temperature $T_{comp.}$ between the room temperature and the Curie temperature. However, when the compensation temperature $T_{comp.}$ is present, if the medium temperature exceeds it, ① the direction of magnetization is reversed, and ② A and P types are reversed. For these reasons, a description must be complicated accordingly. In this case, the direction of the bias field Hb is opposite to the direction in the above description at the room temperature.

In both the first and second categories, the recording medium is preferably constituted by the M and W layers each of which comprises an amorphous ferrimagnetic material selected from transition metal (e.g., Fe, Co)—heavy rare earth metal (e.g., Gd, Tb, Dy, and the like) alloy compositions.

When the materials of both the M and W layers are selected from the transition metal-heavy rare earth metal alloy compositions, the direction and level of magnetization appearing outside the alloys are determined by the relationship between the direction and level of sublattice magnetization of transition metal (TM) atoms, and those of heavy rare earth metal (RE) atoms inside the alloys. For example, the direction and level of TM sublattice magnetization are represented by a vector indicated by a dotted arrow , those of RE sublattice magnetization are represented by a vector indicated by a solid arrow ↑, and the direction and level of magnetization of the entire alloy are represented by a vector indicated by a hollow arrow . In this case, the hollow arrow (vector) is expressed as a sum of the dotted and solid arrows (vectors). However, in the alloy, the dotted and solid arrows (vectors) are directed in the opposite directions due to the mutual effect of the TM sublattice magnetization and the RE sublattice magnetization. Therefore, when strengths of these magnetizations are equal to each other, the sum of the dotted and solid arrows (vectors), i.e., the vector of the alloy is zero (i.e., the level of magnetization appearing outside the alloy becomes zero). The alloy composition making the vector of the alloy zero is called a compensation composition. When the alloy has another composition, it has a strength equal to a difference between the strengths of the two sublattice magnetizations, and has a hollow arrow (vector or ) having a direction equal to that of the larger vector. Thus, a magnetization vector of the alloy is expressed by illustrating dotted and solid vectors adjacent to each other, as shown in, e.g., FIG. 11. The RE and TM sublattice magnetization states of the alloy can be roughly classified into four states, as shown in FIGS. 12(1A) to 12(4A). Magnetization vectors (hollow arrow or ) of the alloy in the respective states are shown in FIGS. 12(1B) to 12(4B). For example, the alloy in the sublattice magnetization state shown in FIG. 12(1A) has a magnetization vector shown in FIG. 12(1B).

When one of the strengths of the RE and TM vectors is larger than the other, the alloy composition is referred to as "oo rich" named after the larger vector (e.g., RE rich).

Both the M and W layers can be classified into TM rich and RE rich compositions. Therefore, when the composition of the M layer is plotted along the ordinate and that of the W layer is plotted along the abscissa, the types of medium as a whole of the basic invention can be classified into four quadrants, as shown in FIG. 5. In FIG. 5, the intersection of the abscissa and the ordinate represents the compensation composition of the two layers.

The P type medium described above belongs to Quadrants I and III in FIG. 5, and the A type medium belongs to Quadrants II and IV.

In view of a change in coercivity against a change in temperature, a given alloy composition has characteristics wherein the coercivity temporarily increases infinitely and then abruptly decreases before a temperature reaches the Curie temperature (at which the coercivity is zero). The temperature corresponding to the infinite coercivity is called a compensation temperature ($T_{comp.}$). At a temperature lower than the compensation temperature, the RE vector (solid arrow) is larger than the TM vector (dotted arrow) (i.e., TM rich), and vice versa at a temperature higher than the compensation temperature. Therefore, the compensation temperature of the alloy having the compensation composition is assumed to be present at the room temperature.

In contrast to this, no compensation temperature is present between the room temperature and the Curie temperature in the TM rich alloy composition. The compensation temperature below the room temperature is irrelevant in the magnetooptical recording, and hence, it is assumed in this specification that the compensation temperature is present between the room temperature and the Curie temperature.

If the M and W layers are classified in view of the presence/absence of the compensation temperature, the medium can be classified into four types. A medium in Quadrant I includes all the four types of media. When both the M and W layers are classified in view of their RE or TM rich characteristics and in view of the presence/absence of the compensation temperature, recording media can be classified into the following nine classes.

TABLE 1

| Class | | | Type |
|---|---|---|---|
| | Quadrant I (P type) | | |
| | M layer: RE Rich | W layer: RE Rich | |
| 1 | $T_{comp.}$ | $T_{comp.}$ | 1 |
| 2 | No $T_{comp.}$ | $T_{comp.}$ | 2 |
| 3 | $T_{comp.}$ | No $T_{comp.}$ | 3 |
| 4 | No $T_{comp.}$ | No $T_{comp.}$ | 4 |
| | Quadrant II (A type) | | |
| | M layer: RE Rich | W layer: TM Rich | |
| 5 | $T_{comp.}$ | No $T_{comp.}$ | 3 |
| 6 | No $T_{comp.}$ | No $T_{comp.}$ | 4 |
| | Quadrant III (P type) | | |
| | M layer: TM Rich | W layer: TM Rich | |
| 7 | No $T_{comp.}$ | No $T_{comp.}$ | 4 |
| | Quadrant IV (A type) | | |
| | M layer: TM Rich | W layer: TM Rich | |
| 8 | No $T_{comp.}$ | $T_{comp.}$ | 2 |
| 9 | No $T_{comp.}$ | No $T_{comp.}$ | 4 |

In the above description, a two-layered film consisting of the M and W layers has been exemplified. An over-write operation is enabled even in a medium including a multi-layered film consisting of three or more layers as long as the medium has the above-mentioned two-layered film. In particular, in the above description, the initial field Hini. is used as the external means. However, in the basic invention, any other external means may be employed. That is, the direction of magnetization of the W layer need only be aligned in a predetermined direction before a time immediately before recording.

For this reason, a structure using, as an external means, an exchange coupling force from an initializing layer in place of Hini. was invented (Japanese Journal "OPTRONICS", 1990, No. 4, pp. 227-231; International Application Laid-Open WO 90/02400 for further details). This invention will be referred to as an alternative invention hereinafter. The alternative invention will be described below.

DESCRIPTION OF ALTERNATIVE INVENTION

FIG. 13 shows a structure of a medium according to the alternative invention. This medium comprises a substrate and a magnetic film formed on the substrate. The magnetic film has a four-layered structure constituted by sequentially stacking an M layer 1 consisting of a perpendicularly magnetizable magnetic thin film, a W layer 2 consisting of a perpendicularly magnetizable magnetic thin film, a switching layer (to be referred to as an S layer hereinafter; also referred to as a control layer in the above-mentioned journal "OPTRONICS") 3 consisting of a perpendicularly magnetizable magnetic thin film, and an initializing layer (to be referred to as an I layer hereinafter) 4 consisting of a perpendicularly magnetizable magnetic thin film (in some cases, the S layer 3 may be omitted). The M and W layers are exchange-coupled to each other, and the direction of magnetization of only the W layer can be aligned in a predetermined direction without changing the direction of magnetization of the M layer at a room temperature In addition, the W and I layers are exchange-coupled to each other via the S layer at a temperature equal to or lower than a Curie temperature of the S layer.

The I layer has a highest Curie temperature, and does not lose its magnetization upon radiation of a high-level laser beam. The I layer always holds magnetization in a predetermined direction, and serves as means for repetitively "initializing" the W layer to prepare for the next recording every time recording is performed. For this reason, the I layer is called the initializing layer.

However, in a process of a high-temperature cycle (e.g., near $T_H$), the magnetization of the W layer must be reversed). In this case, the influence from the I layer must become negligibly small. When the temperature is increased, an exchange coupling force $\sigma_{w24}$ between the W and I layers can be conveniently decreased.

However, when sufficient $\sigma_{w24}$ remains even at $T_H$, the S layer is required between the W and I layers. If the S layer consists of a non-magnetic member, $\sigma_{w24}$ can be reduced to zero or can become very small. However, $\sigma_{w24}$ must be large enough to "initialize" the W layer at a certain temperature between $T_H$ and the room temperature. In this case, the S layer must apply an apparently sufficient exchange coupling force between the W and I layers. For this purpose, the S layer must consist of a magnetic member. Therefore, the S layer is converted to a magnetic member at a relatively low temperature to apply an apparently sufficient exchange coupling force $\sigma_{w24}$ between the W and I layers, and is converted to a non-magnetic member at a relatively high temperature to apply a zero or very small exchange coupling force $\sigma_{w24}$ between the W and I layers. For this reason, the S layer is called the switching layer.

The principle of a four-layered film over-write operation will be described below with reference to FIG. 13. A typical example will be described below, but there are some examples in addition to this example. A hollow arrow indicates a direction of magnetization of each layer.

A condition before recording corresponds to either CONDITION 1 or CONDITION 2. Paying attention to an M layer, in CONDITION 1, an "A-directed" bit ($B_1$) is formed, or in CONDITION 2, a "non-A-directed" bit ($B_0$) is formed, a magnetic wall (indicated by a bold line) is present between the M layer and a W layer, and the medium is in a relatively unstable (metastable) state.

LOW-TEMPERATURE CYCLE

A laser beam is irradiated on the bit in CONDITION 1 or 2 to increase a temperature. First, magnetization of an S layer disappears. For this reason, CONDITION 1 transits to CONDITION 3, or CONDITION 2 transits to CONDITION 4.

When the temperature is further increased, and reaches $T_{LS}$, the magnetization of the M layer is weakened, and the influence from the W layer via an exchange coupling force is strengthened. As a result, the direction of magnetization of the M layer in CONDITION 4 is reversed, and at the same time, the magnetic wall between the two layers disappears. This condition corresponds to CONDITION 5. The bit in CONDITION 3 originally has no magnetic wall between the two layers, and directly transits to CONDITION 5.

When irradiation of the laser beam is stopped or an irradiated portion is separated from the irradiation position, the temperature of the bit in CONDITION 5 begins to fall, and CONDITION 1 is then established via CONDITION 3.

This is the low-temperature cycle.

When the temperature is further increased from that in CONDITION 5, and exceeds the Curie temperature of the M layer, magnetization disappears, and CONDITION 6 is established. When irradiation of the laser beam is stopped or an irradiated portion is separated from the irradiation position, the temperature of the bit in CONDITION 6 begins to fall, and then reaches a temperature slightly lower than the Curie temperature of the M layer. Thus, magnetization appears in the M layer. In this case, the direction of magnetization of the M layer is influenced by the W layer via the exchange coupling force, and is aligned in a stable direction with respect to the direction of magnetization of the W layer (i.e., in a direction not to form a magnetic wall between the layers). Since the medium is of P type, CONDITION 5 is reproduced. The temperature is further decreased, and CONDITION 3 is established accordingly. Thereafter, a bit in CONDITION 1 is formed. This process is another example of the low-temperature cycle.

HIGH-TEMPERATURE CYCLE

When a laser beam is irradiated on the bit in CONDITION 1 or 2 to increase a temperature, CONDITION 6 is established via CONDITION 5, as described above.

When the temperature is further increased, the coercivity of the W layer is decreased considerably. For this reason, the direction of magnetization of the W layer is reversed by a bias field Hb ↓. This is CONDITION 8.

When irradiation of the laser beam is stopped or an irradiated portion is separated from the irradiation position, the medium temperature begins to fall. The medium temperature then reaches a temperature slightly lower than the Curie temperature of the M layer. Thus, magnetization appears in the M layer. The direction of magnetization of the M layer is influenced by the W layer via the exchange coupling force, and is aligned in a stable direction with respect to the direction of magnetization of the W layer (i.e., in a direction not to form a magnetic wall between the layers). Since the medium is of P type, CONDITION 9 appears.

When the temperature is further decreased, magnetization appears in the S layer. As a result, the W layer and an I layer are magnetically coupled (by the exchange coupling force). As a result, the direction of magnetization of the W layer is aligned in a stable direction with respect to the direction of magnetization of the I layer (i.e., in a direction not to form a magnetic wall between the layers). Since the medium is of P type, the direction of magnetization of the W layer is reversed to the "A direction", and as a result, an interface wall is formed between the M and W layers. This condition is maintained at the room temperature, and a bit in CONDITION 2 is formed.

This is the high-temperature cycle.

When the temperature is further increased after CONDITION 8 appears by the bias field Hb ↓, the temperature then exceeds the Curie temperature of the W layer. As a result, CONDITION 7 appears.

When irradiation of the laser beam is stopped or an irradiated portion is separated from the irradiation position, the medium temperature begins to fall. The medium temperature then reaches a temperature slightly lower than the Curie temperature of the W layer. Thus, magnetization appears in the W layer. The direction of magnetization of the W layer follows the direction of the bias field Hb ↓. As a result, CONDITION 8 appears.

When the temperature is further decreased, a bit in CONDITION 2 is formed via CONDITION 9. This process is another example of the high-temperature cycle.

OVER-WRITE OPERATION

As described above, a bit ($B_1$) in CONDITION 1 is formed in the low-temperature cycle, and a bit ($B_0$) in CONDITION 2 is formed in the high-temperature cycle independently of a previous recording state. Therefore, an over-write operation is enabled.

PROBLEMS TO BE SOLVED BY THE INVENTION

The present inventor manufactured samples of an over-write capable magnetooptical recording medium which has a four-layered structure, and does not require an initial field Hini. according to the alternative invention described above, and examined their characteristics, especially, an allowable range (margin) of high level $P_H$.

Every time an over-write operation was performed while gradually changing the margin of $P_H$, a bit error rate (BER) was measured by reproducing information. When the high-level intensity exceeded a predetermined $P_H$ value, the BER began to increase. The BER is preferably as low as possible, and a range in which the BER is not increased is determined as the $P_H$ margin.

However, an additionally manufactured medium sample had a narrow $P_H$ margin, and this medium sample was unsatisfactory in a practical application. A problem to be solved by the present invention is the narrow $P_H$ margin.

The narrow $P_H$ margin causes the following secondary problems. ① The setting precision of the intensity level of a semiconductor laser normally used as a light source is about ±10%, individual lasers suffer from a variation of about ±10% upon manufacture, and the setting precision drifts by about ±10% as time elapses. ② The setting precision drifts by about ±10% due to aging, or a change in environmental condition. ③ The intensity of a laser beam which reaches the medium via an optical system drifts by about ±10% as time elapses under the influence of dust, and the like. ④ Individual optical systems suffer from a variation of about ±10% upon manufacture, and the intensity of a laser beam which reaches the medium is varied by about ±10%. ⑤ Due to these variations or drifts, if the $P_H$ margin is narrow, the yield of recording apparatuses is decreased, and information is recorded at an intensity exceeding the $P_H$ margin, resulting in an increase in BER.

SUMMARY OF THE INVENTION

It is an object of the present invention to enlarge a $P_H$ margin.

The present inventor has made extensive studies, and found a cause of an increase in BER when $P_H$ was set beyond the $P_H$ margin. More specifically, the magnetization of the I layer, which must always be aligned in a predetermined direction, was found to be reversed in a state wherein the medium temperature is returned to room temperature after irradiation of the $P_H$-level laser beam. It is presumed that when the medium temperature is increased to $T_H$, the coercivity of the I layer is decreased, and for this reason, the magnetization of the I layer, which is opposite to the direction of the bias field Hb, is reversed by Hb.

Therefore, the present inventor noticed that the magnetization of the I layer is not reversed if the bias field Hb is designed to have the same direction as that of the magnetization of the I layer, and manufactured and examined samples of an over-write capable magnetooptical recording medium having a four-layered structure, in which (1) the W layer is RE rich at room temperature, and has a compensation temperature between room temperature and its Curie temperature, and (2) the I layer is RE rich at room temperature, and has no compensation temperature between room temperature and its Curie temperature. Thus, the present inventor found that the $P_H$ margin can be enlarged, thus achieving the present invention.

According to the present invention, there is provided an over-write capable magnetooptical recording medium comprising a memory layer consisting of perpendicularly magnetizable magnetic film, a writing layer consisting of perpendicularly magnetizable magnetic film, the writing layer being RE-rich at room temperature and having compensation temperature between room temperature and its Curie temperature, a switching layer consisting of perpendicularly magnetizable magnetic film, and an initializing layer consisting of perpendicularly magnetizable magnetic film, the initializing layer being RE-rich at room temperature and having no compensation temperature between room temperature and its Curie temperature, these four layers being stacked in order, wherein the memory layer and the writing layer are exchange-coupled, a direction of magnetization of only the writing layer can be aligned in a predetermined direction at room temperature without changing a direction of magnetization of the memory layer, and the writing layer and the initializing layer are exchange-coupled via the switching layer at a temperature not more than the Curie temperature of the switching layer.

According to the finding of the present inventor, the I layer preferably consists of an alloy expressed by the following general formula:

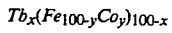

(for 25 atomic. %$<x<$40 atomic. %, and 10 atomic. %$<y<$100 atomic. %)

The principle of the over-write operation of the four-layered film according to the present invention will be described below with reference to FIG. 1. The four-layered film comprises the M layer, the W layer, the S layer, and the I layer stacked in the order named. A large hollow arrow in each layer in FIG. 1 represents the direction of magnetization of the corresponding layer, and a small dotted arrow in the hollow arrow indicates the direction of transition-metal sublattice magnetization. An exchange coupling force acts to cause the directions of transition-metal sublattice magnetization of two layers to coincide with each other.

Assume that the M layer is TM rich, and has no $T_{comp.}$ between the room temperature and its Curie temperature, the W layer is RE rich, and has $T_{comp.}$ between the room temperature and its Curie temperature according to the present invention, the S layer is TM rich, and has no $T_{comp.}$ between the room temperature and its Curie temperature, and the I layer is RE rich, and has no $T_{comp.}$ between the room temperature and its Curie temperature according to the present invention. However, the M and S layers are not limited to this example.

A condition at the room temperature before recording corresponds to either CONDITION 1 or 2. Paying attention to the M layer, a "non-A directed" bit ($B_0$) is formed in CONDITION 1, or an "A-directed" bit ($B_1$) is formed in CONDITION 2. In condition 2 the M and W layers have the opposite directions of sublattice magnetization. For this reason, the medium is in a relatively unstable (metastable) state, and an interface wall (indicated by a bold line) is present between the M and W layers.

LOW-TEMPERATURE CYCLE

When a laser beam is irradiated on the bit in CONDITION 1 or 2 to increase a temperature, the medium temperature reaches a temperature $T_{LS}$ first. The magnetization of the M layer is weakened, and the influence from the W layer via the exchange coupling force is strengthened. As a result, sublattice magnetization of the M layer in CONDITION 2 is reversed, and at the same time, the magnetic wall between the M and W layer disappears. In this case, since the M layer is TM rich, and TM sublattice magnetization is larger than RE sublattice magnetization, the magnetization of the M layer is also reversed to follow the TM sublattice magnetization. This is CONDITION 3. Thus, a bit in the "non-A direction" is formed.

Since a bit in CONDITION 1 originally has no magnetic wall between the M and W layers, it is left unchanged at $T_{LS}$, and directly transits to CONDITION 3.

In this manner, the low-temperature cycle is completed. More specifically, the "non-A-directed" bit ($B_0$) is formed in the M layer.

The lowest temperature (equal to the lowest temperature at which the interface wall between the M and W layers disappears) causing the low-temperature cycle is called $T_{LS}$. If $T_{LS}$ is higher than the Curie temperature of the S layer, the low-temperature cycle occurs after the magnetization of the S layer disappears unlike in the process shown in FIG. 1. However, this process may also be adopted.

Assume that the laser beam irradiation continues, the medium temperature is increased beyond $T_{LS}$, and exceeds the Curie temperature of the S layer. Thus, the magnetization of the S layer disappears.

Assume that the temperature is further increased, and the medium temperature exceeds $T_{comp.}$ of the W layer. Thus, the W layer transits from RE rich to TM rich. For this reason, the direction of magnetization of the W layer follows the direction of TM sublattice magnetization. In other words, the direction of magnetization of the W layer is reversed. This is CONDITION 4.

When the beam irradiation further continues, the medium temperature then exceeds the Curie temperature of the M layer, and magnetization of the M layer disappears. However, sufficient magnetization remains in the W layer, and is not reversed by the bias field Hb. This is CONDITION 5.

When the laser beam irradiation is stopped or the irradiated portion is separated from a radiation position, the temperature of the bit in CONDITION 5 begins to fall. When the medium temperature is decreased to a temperature slightly below the Curie temperature of the M layer, magnetization appears in the M layer. The direction of magnetization of the M layer is influenced by the W layer via $\sigma_w$, and the direction of sublattice magnetization of the M layer follows that of the W layer. This state is stable in terms of energy. Since the W layer is TM rich at this temperature, the direction of magnetization of the W layer is controlled by the direction of TM sublattice magnetization. Therefore, CONDITION 4 is reproduced.

When the temperature is further decreased, the medium temperature is then decreased below $T_{comp.}$ of the W layer. Thus, the W layer transits from TM rich to RE rich. For this reason, the direction of magnetization of the W layer follows the direction of RE sublattice magnetization (opposite to the direction of TM sublattice magnetization). In other words, the direction of magnetization of the W layer is reversed.

When the temperature is further decreased, and is decreased to a temperature slightly below the Curie temperature of the S layer, magnetization appears in the S layer. This is CONDITION 3.

This process is another example of the low-temperature cycle.

HIGH-TEMPERATURE CYCLE

When a laser beam is irradiated on the bit in CONDITION 1 or 2 to increase a temperature, CONDITION 5 is established via CONDITION 3 or 4, as described above.

Assume that the beam irradiation further continues, and the temperature is increased. Thus, the coercivity of the W layer is considerably decreased. For this reason, the direction of magnetization of the W layer is reversed by the bias field Hb. This is CONDITION 7.

Assume that the laser beam irradiation continues, the medium temperature is further increased, and exceeds the Curie temperature of the W layer. Thus, the magnetization of the W layer also disappears. This is CONDITION 6.

When the laser beam radiation is stopped or the irradiated portion is separated from an irradiation position, the temperature of the bit in CONDITION 6 begins to fall. When the medium temperature is decreased to a temperature slightly below the Curie temperature of the W layer, magnetization appears in the W layer. The direction of magnetization of the W layer follows the direction of the bias field Hb. This is CONDITION 7. As described above, there are two processes to CONDITION 7.

Assume that the medium temperature is further decreased from a temperature in CONDITION 7, and reaches a temperature slightly below the Curie temperature of the M layer. Thus, magnetization appears in the M layer. At this time, the direction of magnetization of the M layer is influenced by the W layer via $\sigma_w$, and the direction of sublattice magnetization of the M layer follows the direction of sublattice magnetization of the W layer. This state is stable in terms of energy. Since the W layer is TM rich at this temperature, the direction of magnetization of the W layer is controlled by the direction of TM sublattice magnetization. For this reason, CONDITION 8 appears.

When the temperature is further decreased, the medium temperature is decreased below $T_{comp.}$ of the W layer. Thus, the W layer transits from TM rich to RE rich. For this reason, the direction of magnetization of W layer follows the direction of RE sublattice magnetization (opposite to the direction of TM sublattice magnetization). In other words, the direction of magnetization of the W layer is reversed. This is CONDITION 9. More specifically, an "A-directed" bit ($B_1$) is formed in the M layer.

The above-mentioned process is the essential part of the high-temperature cycle.

When the temperature is further decreased, and reaches a temperature slightly below the Curie temperature of the S layer, magnetization appears in the S layer. As a result, the W and I layers are magnetically coupled (by the exchange coupling force). More specifically, the direction of TM sublattice magnetization of the W layer follows that of the I layer. Since the W layer is RE rich at this temperature, the direction of magnetization of the W layer follows the direction of RE sublattice magnetization (opposite to the direction of TM sublattice magnetization). In other words, the direction of magnetization of the W layer is reversed. On the other hand, since the direction of TM sublattice magnetization of the W layer is opposite to that of the M layer, an interface wall (indicated by a bold line in CONDITION 2) is formed between the W and M layers. This is CONDITION 2. However, as one characteristic feature of this four-layered film medium, CONDITION 2 is maintained in a metastable state between the Curie temperature of the S layer and the room temperature.

OVER-WRITE OPERATION

As described above, a bit ($B_1$) is CONDITION 1 is formed in the low-temperature cycle, and a bit ($B_0$) in CONDITION 2 is formed in the high-temperature cycle independently of a previous recording state. Therefore, the over-write operation is enabled.

RELATIONSHIP BETWEEN BIAS FIELD Hb AND I LAYER

The bias field Hb is related to transition from CONDITION 5 to CONDITION 6 or 7 in FIG. 1. In this case, the direction of Hb is the same as the direction of magnetization of the I layer. This is one characteristic feature of the present invention. For this reason, even when the I layer is exposed to the high temperature in the high-temperature cycle, and the coercivity of the I layer is decreased, the direction of magnetization of the I layer is never reversed under the protection of Hb.

Therefore, even if high $P_H$ is set, since the direction of magnetization of the I layer is left unchanged, it is presumed that the BER is low. In other words, $P_H$ can be set to be high accordingly, and hence, the $P_H$ margin can be enlarged.

In contrast to this, in the medium of the alternative invention as the prior art, since the direction of magnetization of the I layer is opposite to the direction of Hb, when the coercivity of the I layer is decreased at the high temperature, the direction of magnetization of the I layer is reversed. For this reason, when high $P_H$ is set, it is presumed that the BER is increased. In other words, $P_H$ cannot be set to be so high, and hence, the $P_H$ margin is narrowed.

In the medium of the present invention, since the I layer does not have $T_{comp.}$ between the room temperature and the Curie temperature, the magnetization of the I layer will not be reversed in the middle of the process, and the direction of magnetization of the I layer is always the same as the direction of Hb. Thus, the magnetization of the I layer can be prevented from being accidentally reversed by Hb.

BRIEF DESCRIPTION OF THE DRAWINGS

FIG. 5 is a map showing types of media classified into four quadrants;

FIG. 6 is a graph showing the relationship between a coercivity and a temperature of first and second layers of an overwrite-capable magnetooptical recording medium;

FIG. 7 is a schematic view showing directions of magnetization of the first and second layers;

FIG. 13 is a diagram for explaining the principle of an over-write operation of an over-write capable magnetooptical recording medium having a four-layered film structure according to the alternative invention.

DETAILED DESCRIPTION OF THE PREFERRED EMBODIMENT

Figure 1:
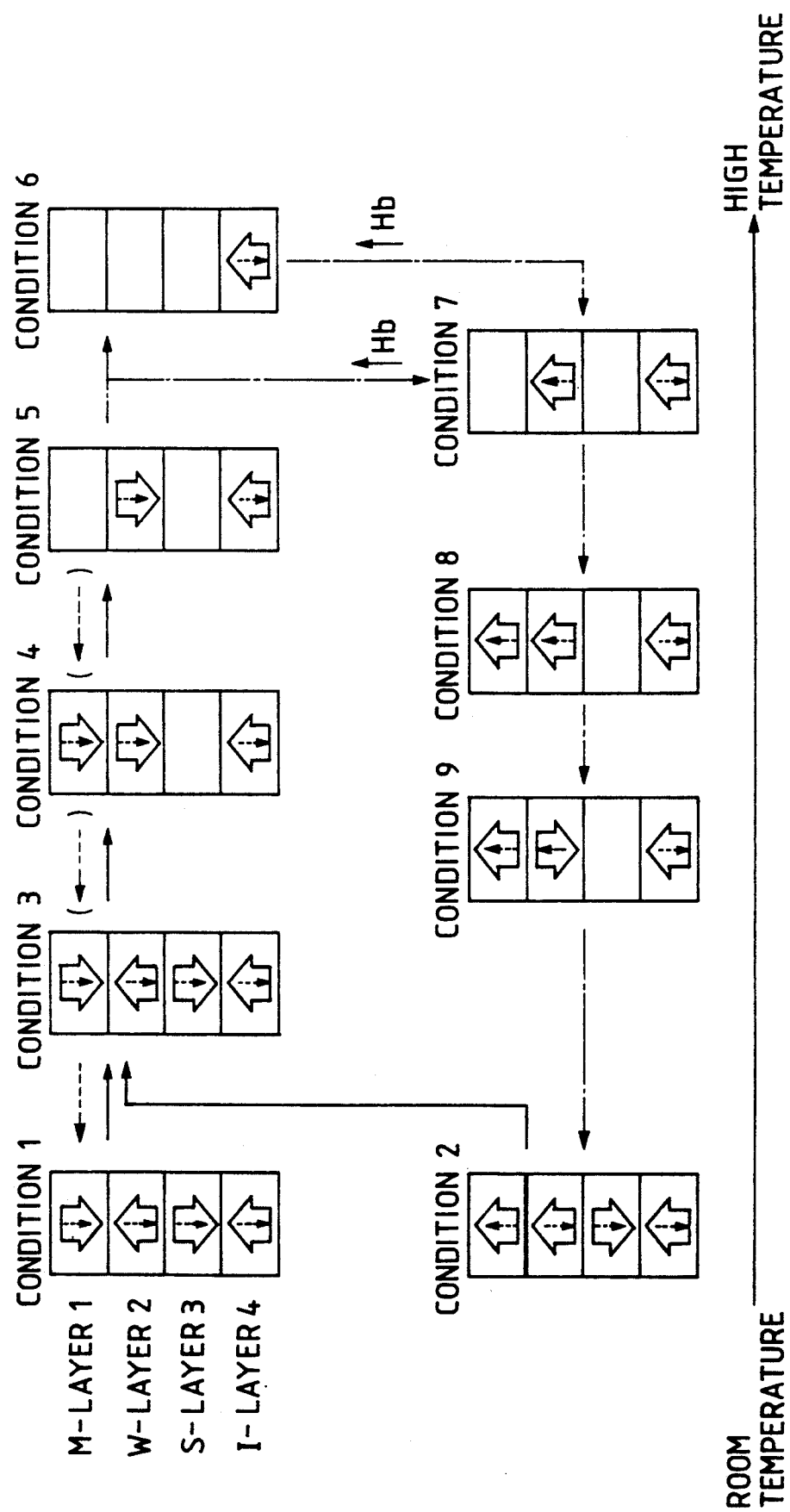
FIG. 1 is a diagram for explaining the principle of an over-write operation using a typical medium of the present invention.
Figure 2:
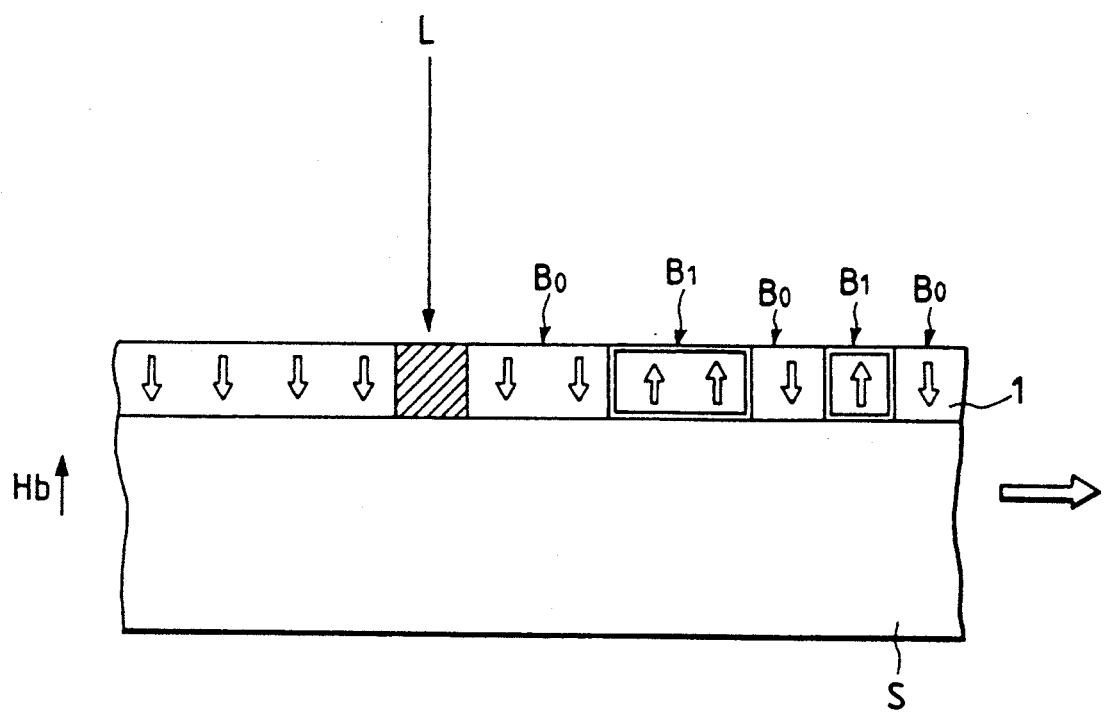
FIG. 2 is a schematic view for explaining the principle of recording of a magnetooptical recording method.
Figure 3:
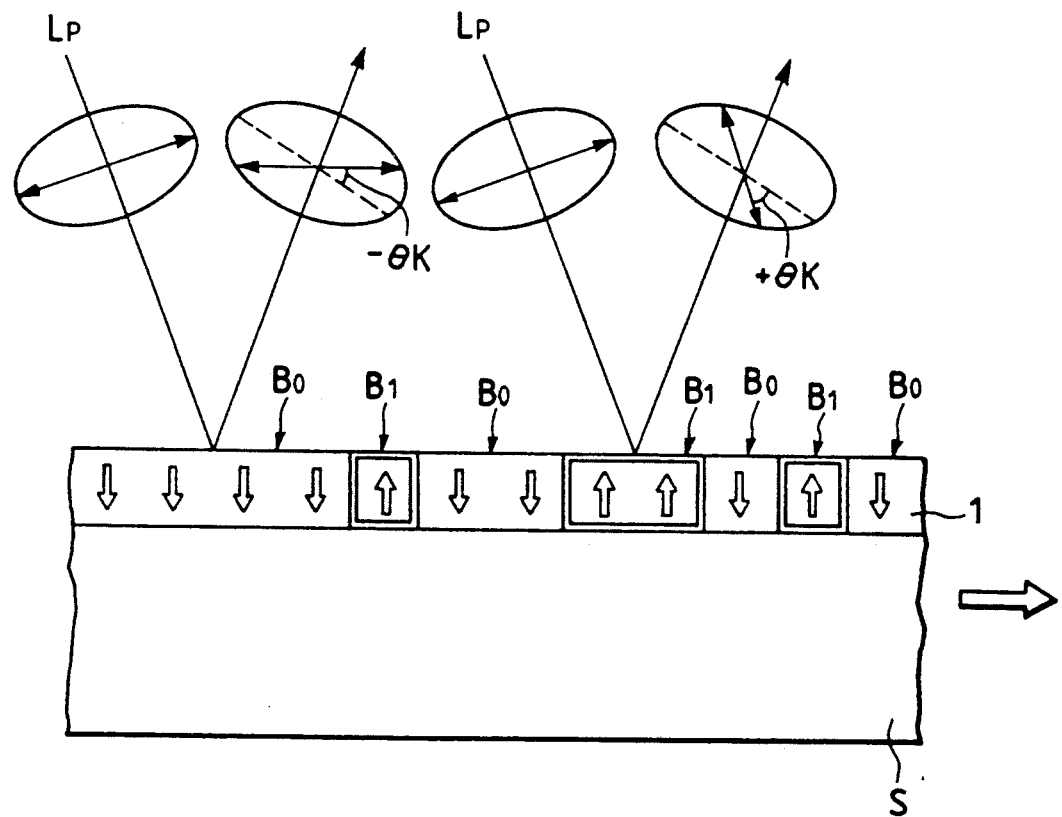
FIG. 3 is a schematic view for explaining the principle of reproduction of the magnetooptical recording method.
Figure 4A:
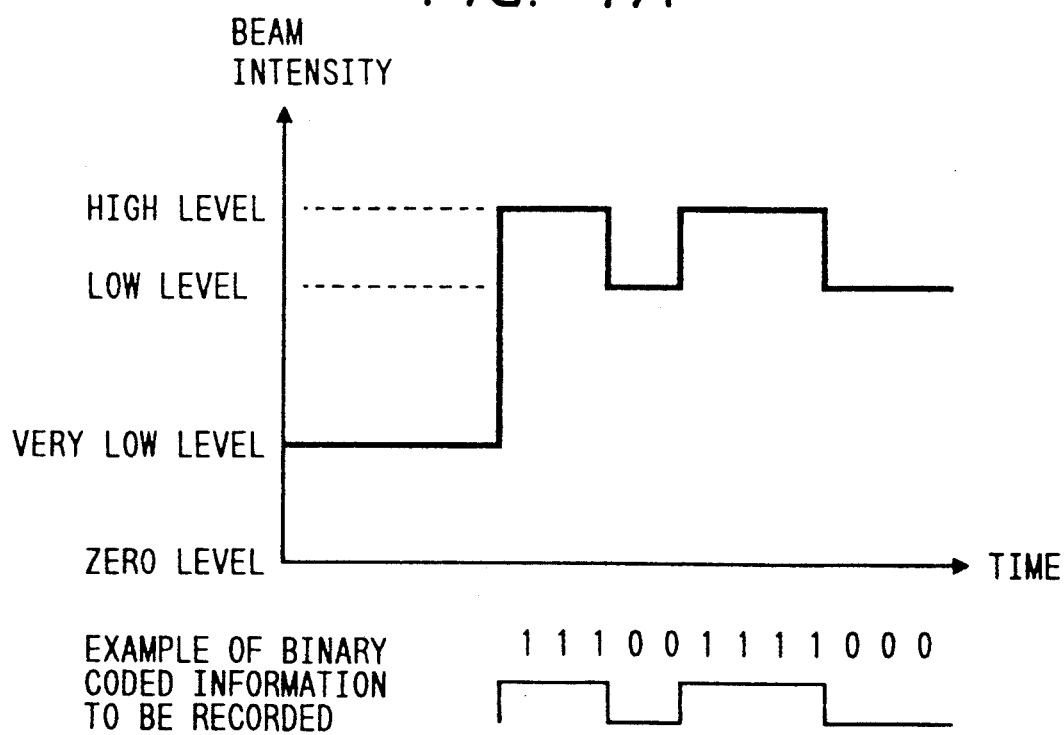
FIG. 4A is a waveform chart of a laser beam when an overwrite operation is performed according to the basic invention.
Figure 4B:
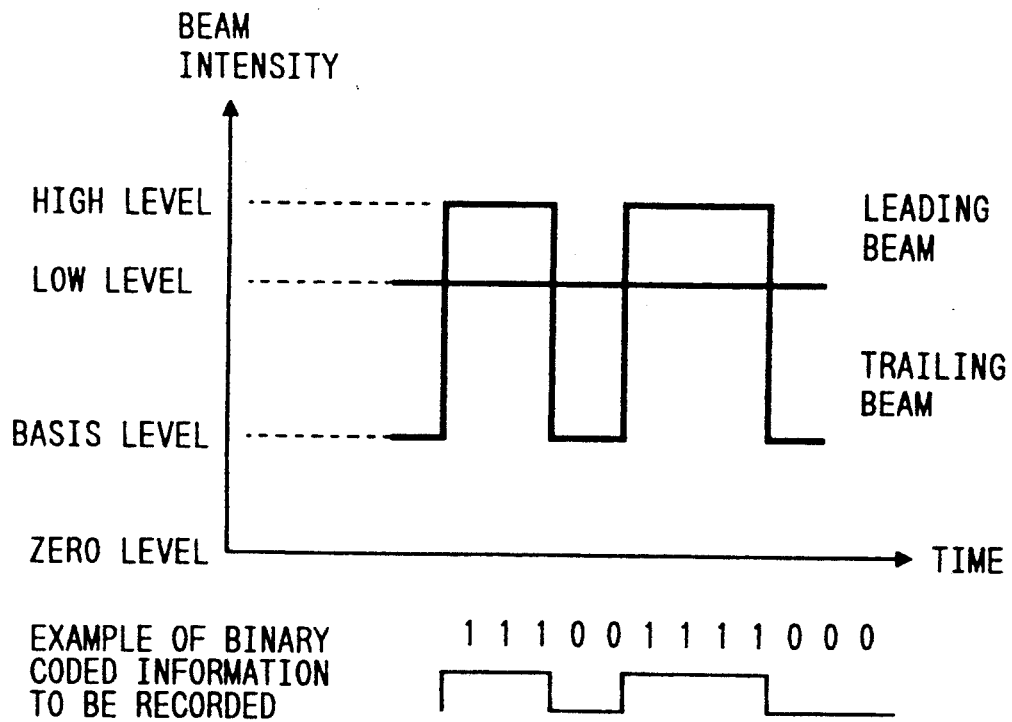
FIG. 4B is a waveform chart of a laser beam when an overwrite operation is performed using two beams according to the basic invention.
Figure 8:
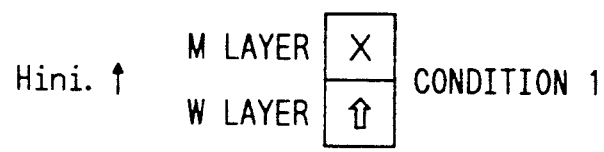
FIG. 8 is a diagram showing changes in direction of magnetization of the first and second layers.
Figure 8:
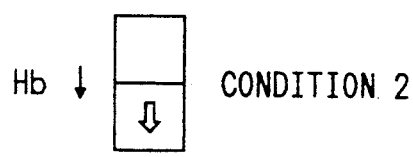
Figure 8:
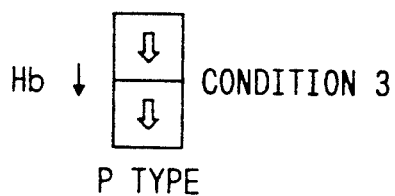
Figure 8:
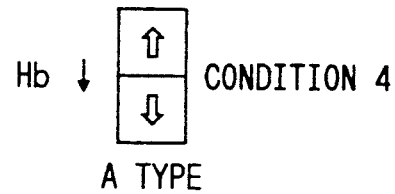
Figure 8:
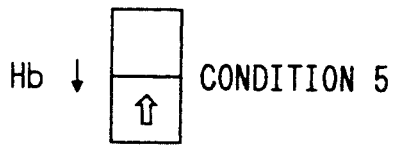
Figure 8:
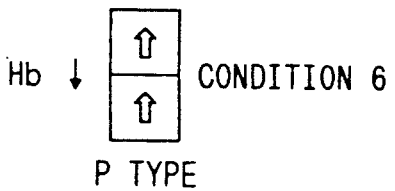
Figure 8:
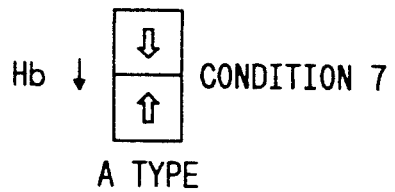
Figure 9A:
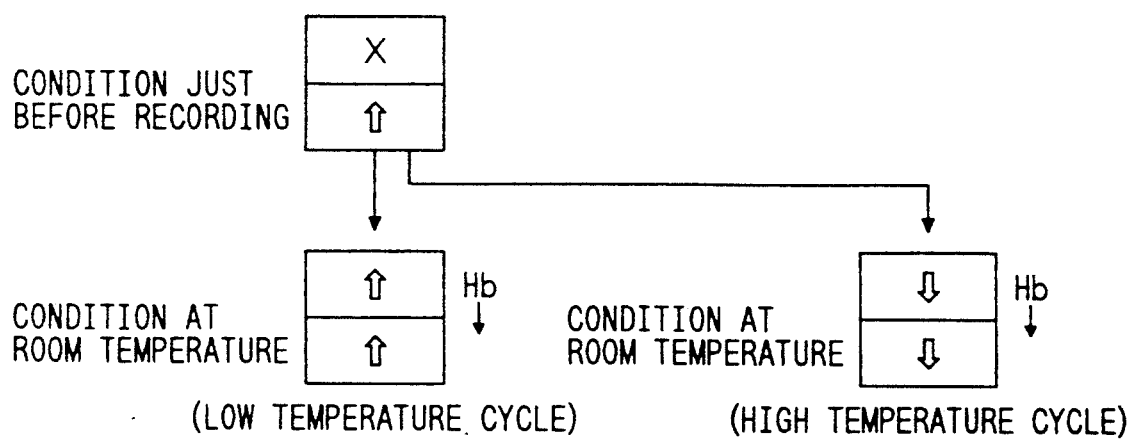
FIGS. 9A and 9B are respectively diagrams showing changes in direction of magnetization of the first and second layers of P and A type media after the low- and high-temperature cycles, and show conditions at a room temperature.
Figure 9B:
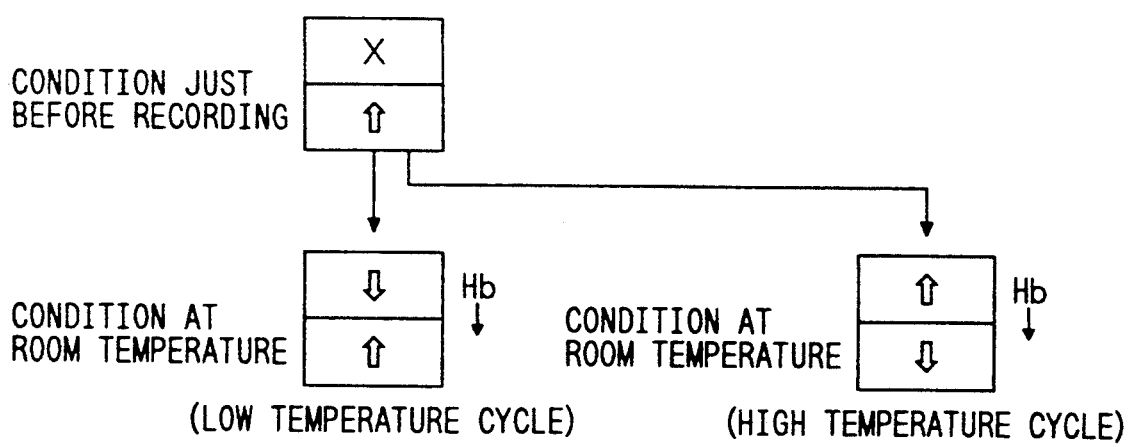
Figure 10:
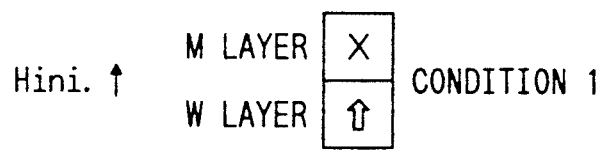
FIG. 10 is a diagram showing changes in direction of magnetization of the first and second layers.
Figure 10:
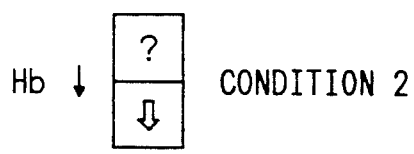
Figure 10:
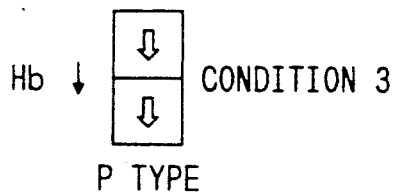
Figure 10:
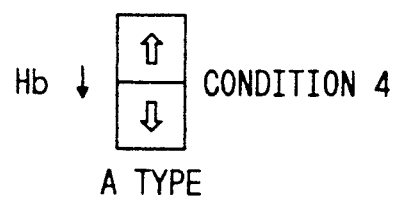
Figure 10:
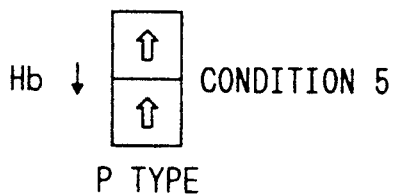
Figure 10:
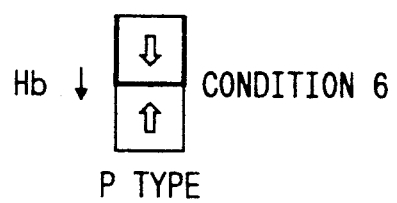
Figure 10:
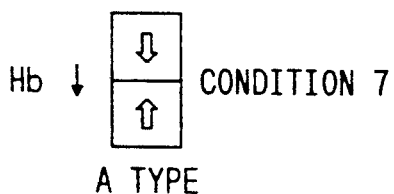
Figure 10:
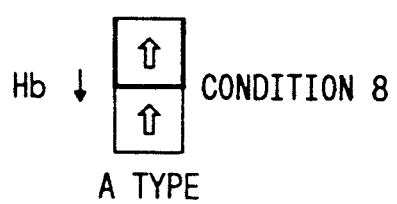
Figure 10:
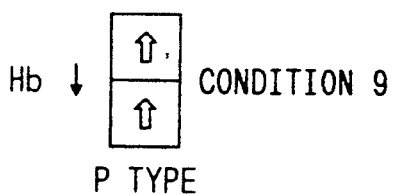
Figure 10:
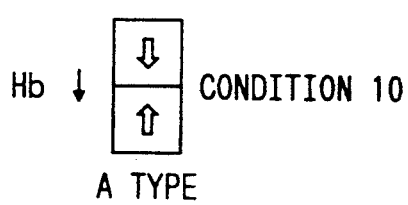
Figure 11:
FIG. 11 is an explanatory view for comparing a vector (solid arrow) representing a sublattice magnetization of a rare-earth (RE) atom, and a vector (dotted arrow) representing a sublattice magnetization of a transition-metal (TM) atom.
Figure 12:
FIGS. 12(1A) to (4B) are explanatory views showing the relationship between the sublattice magnetization vectors and an arrow indicating the direction of magnetization of an alloy.
Figure 12:
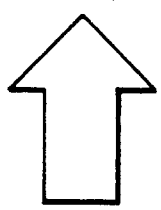
Figure 12:
Figure 12:
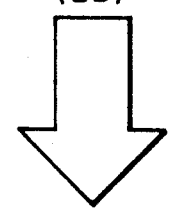
Figure 12:
Figure 12:
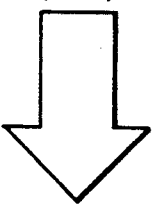
Figure 12:
Figure 12:
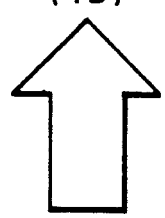

The present invention will be described in detail below by way of its example. However, the present invention is not limited to this.

Using an RF magnetron sputtering apparatus, a 500-Å thick $Tb_{22}Fe_{73}Co_5$ M layer, a 1,000-Å thick $Tb_5Dy_{23}Fe_{40}Co_{32}$ W layer, a 200-Å thick $Tb_{21}Fe_{79}$ S layer, and a 500-Å thick $Tb_{31}Fe_{20}Co_{49}$ I layer were sequentially stacked on a glass substrate having a diameter of 200 mm, thus manufacturing an over-write capable magnetooptical recording medium of this embodiment.

EVALUATION TEST 1

A 10-kOe external field was applied to the medium of this Example to align the direction of magnetization of the I layer in the "A direction".

Then, the medium was rotated at a linear velocity of 10 m/sec, and a laser beam having a wavelength of 830 nm was irradiated on a given portion of the medium while applying the "A-directed" bias field Hb=300 Oe to the medium, thereby overwrite-recording reference information. In this case, the laser beam intensity was set to have high level $P_H$=15.0 mW (on disk), and low level $P_L$=5.0 mW (on disk), and the laser beam was pulse-modulated between these levels at a frequency of 4 MHz (reference information) (a duty ratio of pulse=50%).

Then, the reference information was changed to a frequency of 3 MHz, and an over-write operation was similarly performed.

Thereafter, reproduction was performed using a laser beam having a reproduction intensity $P_R$=1.0 mW (on disk). When the obtained reproduced signal was analyzed by a spectrum analyzer, the reproduced signal did not include 4-MHz information at all, but included only 3-MHz information. Thus, it was demonstrated that a perfect over-write operation was performed.

EVALUATION TEST 2

Over-write and reproduction operations were repeated while changing $P_H$ between 8 to 20 mW at 1-mW intervals using the medium of this Example, and a medium of the prior art (alternative invention), thus obtaining a change in BER.

When the $P_H$ margin was obtained from the measurement results, the medium of this Example had a margin wider than that of the medium of the prior art (alternative invention) by about 50%.

What is claimed is:

1. An over-write capable magnetooptical recording medium comprising:
   a memory layer consisting of perpendicularly magnetizable magnetic film;
   a writing layer consisting of perpendicularly magnetizable magnetic film, the writing layer being RE-rich at room temperature and having compensation temperature between room temperature and its Curie temperature;
   a switching layer consisting of perpendicularly magnetizable magnetic film; and
   an initializing layer consisting of perpendicularly magnetizable magnetic film, the initializing layer being RE-rich at room temperature and having no compensation temperature between room temperature and its Curie temperature;
   these four layers being stacked in order;
   wherein the memory layer and the writing layer are exchange-coupled, a direction of magnetization of the writing layer can be aligned in a predetermined direction without changing a direction of magnetization of the memory layer, and the writing layer and the initializing layer are exchange-coupled via the switching layer at a temperature equal to or lower than a Curie temperature of the switching layer.

2. A recording medium according to claim 1, wherein the initializing layer consists of an alloy expressed by the following general formula:

$$Tb_x(Fe_{100-y}Co_y)_{100-x}$$

where subscripts represent values in units of atomic. %, and $25 < x < 40$, and $10 < y < 100$.

* * * * *